(12) United States Patent
Loccufier et al.

(10) Patent No.: US 10,066,113 B2
(45) Date of Patent: *Sep. 4, 2018

(54) AQUEOUS RESIN BASED INKJET INKS

(71) Applicant: AGFA GRAPHICS NV, Mortsel (BE)

(72) Inventors: Johan Loccufier, Mortsel (BE); Luc Decoster, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/303,615

(22) PCT Filed: Apr. 15, 2015

(86) PCT No.: PCT/EP2015/058119
§ 371 (c)(1),
(2) Date: Oct. 12, 2016

(87) PCT Pub. No.: WO2015/158745
PCT Pub. Date: Oct. 22, 2015

(65) Prior Publication Data
US 2017/0029639 A1    Feb. 2, 2017

(30) Foreign Application Priority Data

Apr. 15, 2014 (EP) .................... 14164674

(51) Int. Cl.
*C09D 11/30* (2014.01)
*C09D 11/38* (2014.01)
(Continued)

(52) U.S. Cl.
CPC .............. *C09D 11/38* (2013.01); *B01J 13/06* (2013.01); *B01J 13/14* (2013.01); *B01J 13/16* (2013.01);
(Continued)

(58) Field of Classification Search
CPC ...... C09D 11/38; C09D 175/04; C09D 11/30; C09D 11/104; C09D 11/102;
(Continued)

(56) References Cited

U.S. PATENT DOCUMENTS

2009/0227711 A1    9/2009   Carlini et al.
2009/0291225 A1*  11/2009   Takabayashi .......... B41J 11/002
                                                          427/487

(Continued)

FOREIGN PATENT DOCUMENTS

| JP | 1996-259888 A | † | 10/1996 |
| JP | 2003-313476 A | † | 11/2003 |
| JP | 2004-075759 A |   | 3/2004  |

OTHER PUBLICATIONS

Official Communication issued in International Patent Application No. PCT/EP2015/058119, dated Jun. 30, 2015.

(Continued)

*Primary Examiner* — Yaovi M Ameh
(74) *Attorney, Agent, or Firm* — Keating and Bennett, LLP

(57) ABSTRACT

An inkjet ink includes a) an aqueous medium; and b) capsules composed of a polymeric shell surrounding a core; wherein the capsules are dispersed in the aqueous medium using a dispersing group covalently bonded to the polymeric shell; the core contains one or more chemical reactants capable of forming a reaction product upon application of heat and/or light; the polymeric shell includes a polymer selected from the group consisting of polyureas, polyesters, polycarbonates, polyamides, and melamine based polymers and copolymers thereof; and the capsules have an average particle size of no more than 4 μm as determined by dynamic laser diffraction.

20 Claims, 1 Drawing Sheet

(51) Int. Cl.
B01J 13/14 (2006.01)
B41M 7/00 (2006.01)
C09D 11/101 (2014.01)
B01J 13/16 (2006.01)
C09B 67/02 (2006.01)
C09D 11/102 (2014.01)
C09D 11/322 (2014.01)
C09D 11/328 (2014.01)
B01J 13/06 (2006.01)
B41J 2/01 (2006.01)
C09D 11/104 (2014.01)
C09D 175/04 (2006.01)
C08J 3/24 (2006.01)

(52) U.S. Cl.
CPC ............... B41J 2/01 (2013.01); B41M 7/009 (2013.01); B41M 7/0081 (2013.01); C08J 3/241 (2013.01); C09B 67/0097 (2013.01); C09D 11/101 (2013.01); C09D 11/102 (2013.01); C09D 11/104 (2013.01); C09D 11/30 (2013.01); C09D 11/322 (2013.01); C09D 11/328 (2013.01); C09D 175/04 (2013.01); C08J 2300/00 (2013.01)

(58) Field of Classification Search
CPC ... C09D 11/328; C09D 11/322; C09D 11/101; C08J 3/241; C08J 2300/00; B41J 2/01; B01J 13/06; B01J 13/16; B01J 13/14; C09B 67/0097; B41M 7/009; B41M 7/0081
See application file for complete search history.

(56) References Cited

U.S. PATENT DOCUMENTS

| | | |
|---|---|---|
| 2011/0237700 A1 | 9/2011 | Miyabayashi |
| 2011/0261108 A1 | 10/2011 | Aoki et al. |
| 2012/0021362 A1* | 1/2012 | Jarvis ............... B41M 5/285 430/363 |
| 2012/0120146 A1 | 5/2012 | Coggan et al. |
| 2013/0310484 A1* | 11/2013 | Furukawa ............... C08J 5/24 523/201 |
| 2014/0002556 A1* | 1/2014 | Sato ............... C09D 11/30 347/100 |
| 2014/0027039 A1* | 1/2014 | Czaplicki ............... C09J 5/00 156/62.2 |
| 2017/0029637 A1* | 2/2017 | Loccufier ............ C09D 11/102 |
| 2017/0037270 A1* | 2/2017 | Loccufier ............ C09D 11/102 |
| 2017/0101547 A1* | 4/2017 | Loccufier ............ C09D 11/101 |

OTHER PUBLICATIONS

Marinkovic et al., "Microencapsulation in the Textile Industry", Faculty of Technology and Metallurgy, Scientific Paper, 677.042/.044, 2006, pp. 58-62.
Nelson, "Application of microencapsulation in textiles", International Journal of Pharmaceutics, 242, 2002, pp. 55-62.
Teixeira et al., "A Case Study of Product Engineering: Performance of Microencapsulated Perfumes on Textile Applications", AIChE Journal, vol. 58, No. 6, Jun. 2012, pp. 1939-1950.
Tyagi et al., "Development of phase change materials based microencapsulated technology for buildings: A review", Renewable and Sustainable Energy Reviews 15, 2011, pp. 1373-1391.
Arshady, "Microspheres, Microcapsules & Liposomes, The MML Series vol. 1: Preparation & Chemical Applications", Citus Books 1999, 32 pages.
Arshady, "Microspheres, Microcapsules & Liposomes, The MML Series, vol. 1: Preparation & Chemical Applications", Citus Books 1999, 12 pages.
Lidert, "Microencapsulation: An Overview of the Technology Landscape", Delivery System Handbook for Personal Care and Cosmetic Products, 2005, pp. 181-190.
Schrooyen et al., "Microencapsulation: its application in nutrition", Proceedings of the Nutrition Society, 60, 2001, pp. 475-479.
Yoshizawa, "Trends in Microencapsulation Research", KONA, No. 22, 2004, pp. 23-31.
Blaiszik et al., "Self-Healing Polymers and Composites" Annual Review of Materials Research, vol. 40, 2010, 35 pages.
Arshady, "Microspheres, Microcapsules & Liposomes, The MML Series, vol. 1: Preparation & Chemical Applications", Citus Books 1999, 24 pages.

* cited by examiner
† cited by third party

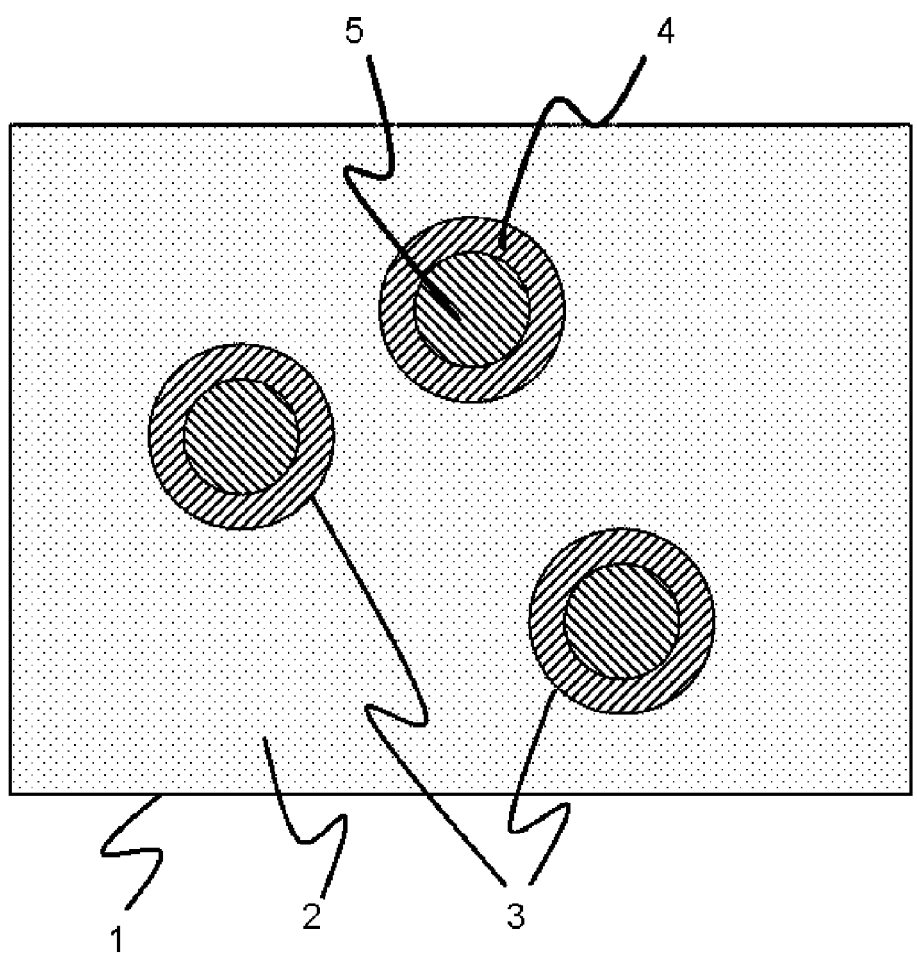

AQUEOUS RESIN BASED INKJET INKS

CROSS-REFERENCE TO RELATED APPLICATIONS

This application is a 371 National Stage Application of PCT/EP2015/058119, filed Apr. 15, 2015. This application claims the benefit of European Application No. 14164674.5, filed Apr. 15, 2014, which is incorporated by reference herein in its entirety.

BACKGROUND OF THE INVENTION

1. Field of the Invention

The present invention relates to aqueous resin based inkjet inks, more specifically aqueous inkjet inks containing capsules, such as microcapsules or nanocapsules.

2. Description of the Related Art

Over the last years, offset and flexographic printing systems are being increasingly replaced by industrial inkjet printing systems due to their flexibility in use, e.g. variable data printing, and due to their enhanced reliability allowing their incorporation into production lines.

Radiation curable inkjet inks have been the preferred choice of ink for reasons of reliability and because high quality images can be printed on non-absorbing ink-receivers. However for economical and ecological reasons, it is desirable to be able to print aqueous resin based inks in a reliable way on these industrial inkjet printing systems.

It has also been observed that the required physical properties of the printed image such as adhesion performance, scratch resistance, solvent resistance, water fastness and flexibility, are much more difficult to obtain by aqueous inks compared to reactive inks.

Encapsulation is a process in which tiny particles or droplets are surrounded by a shell to give small capsules. The material inside the capsule is referred to as the core or the internal phase, whereas the shell is sometimes called a wall. This technology has been applied in different technical fields, such as self healing compositions (Blaiszik et al., Annual Review of Materials, 40, 179-211 (2010)), textile treatment (Marinkovic et al., CI&CEQ 12(1), 58-62 (2006); Nelson G., International Journal of Pharmaceutics, 242, 55-62 (2002), Teixeira et al., AIChE Journal, 58(6), 1939-1950 (2012)), thermal energy storage and release for buildings (Tyagi et al., Renewable and Sustainable Energy Reviews, 15, 1373-1391 (2011)), printing and recording technology (Microspheres, Microcapsules and Liposomes: Volume 1: Preparation and Chemical Applications, editor R. Arshady, 391-417 and ibid., 420-438, Citus Books, London, 1999), personal care, pharmaceuticals, nutrition, agrochemicals (Lidert Z., Delivery System Handbook for Personal Care and Cosmetic Products, 181-190, Meyer R. Rosen (ed.), William Andrew, Inc. 2005; Schrooyen et al., Proceedings of the Nutrition Society, 60, 475-479 (2001)) and electronic applications (Yoshizawa H., KONA, 22, 23-31 (2004)).

The use of encapsulation technology in ink jet inks has largely been limited to the design of encapsulated pigments, where a polymer shell is directly polymerized on the surface of the pigment particles. For example, US 2009227711 A (XEROX) discloses encapsulated nanoscale particles of organic pigments, comprising a polymer-based encapsulating material, and one or more nanoscale organic pigment particles encapsulated by the polymer-based encapsulating material to be used as colorants for compositions such as inks, toners and the like. This approach doesn't allow boosting the physical properties needed in industrial applications.

JP 2004075759 (FUJI) discloses an ink jet ink including a microcapsule comprising at least one hydrophobic dye, at least one hydrophobic polymer and at least one high boiling solvent, where the capsule walls are prepared using a polyfunctional isocyanate compound. All the examples disclosed require the use of an additional water soluble polymer, i.e. gelatine.

Encapsulation as an approach to integrate reactive chemistry in ink jet inks has hardly been disclosed. US 2012120146 A (XEROX) discloses a curable ink comprising microcapsules. The microcapsules contain at least one first reactive component and at least one second component comprising a triggerable compound, and they are dispersed in at least one third reactive component. After stimulus induced rupture of the capsules, polymerisation of the ink is obtained by reaction of the at least one first reactive component with the third reactive component. From Example 6, it should be clear that the microcapsules are integrated into a UV curable ink rather then an aqueous based ink.

US 2014002566 A (SEIKO EPSON) discloses an inkjet ink including a coating film forming material, a polyether-modified silicone oil, and water, resulting in micelles dispersed in an aqueous medium. In one preferred embodiment the inkjet ink is a photocurable inkjet ink by including a photocurable compound in the micelles. A similar concept is disclosed by US2011237700 A (SEIKO EPSON).

US2011261108 A (TOSHIBA TEC) discloses a decolorizable water-based inkjet ink including a color material, a solvent, and a nonionic surfactant, wherein the color material contains a color developable compound and a color developing agent.

Reviewing the synthetic approaches for the synthesis of microcapsules in general, it becomes clear that the use of an additional hydrophilic polymer is required to control the colloid stability, the particle size and the particle size distribution, which are three critical factors for the design of an ink jet ink. However, the use of water soluble polymers in aqueous based ink jet inks very often has a detrimental impact on jetting reliability and latency, aspects which are particularly important in an industrial environment where down time and complex maintenance cycles have to be avoided.

Therefore, there remains a need for aqueous resin based inkjet inks exhibiting good physical properties on a wide range of substrates, while exhibiting high reliability for industrial inkjet printing.

SUMMARY OF THE INVENTION

In order to overcome the problems described above, preferred embodiments of the present invention have been realised with an inkjet ink as defined below.

It was found that reactive chemistry could be incorporated into self-dispersing capsules including at least one dispersing group covalently coupled to the shell polymers lead to stable ink jet inks without the need for additional water soluble polymers. The chemical reactants in the core of the capsules where able to form a reaction product upon application of heat and/or light. A wide variety of substrates could be addressed, including both absorbing substrates, e.g. textiles, and non-absorbing substrates, e.g. glass and polymeric substrates.

Further advantages and benefits of the invention will become apparent from the description hereinafter.

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —NO$_2$.

BRIEF DESCRIPTION OF THE DRAWINGS

FIG. 1 shows an inkjet ink (1) including an aqueous medium (2) and capsules (3) composed of a polymeric shell (4) surrounding a core (5) containing one or more chemical reactants.

DETAILED DESCRIPTION OF THE PREFERRED EMBODIMENTS

Inkjet Inks

The inkjet ink according to a preferred embodiment of the present invention includes at least a) an aqueous medium; and b) capsules composed of a polymeric shell surrounding a core; wherein the capsules are dispersed in the aqueous medium using a dispersing group covalently bonded to the polymeric shell; wherein the core contains one or more chemical reactants capable of forming a reaction product upon application of heat and/or light; wherein the polymeric shell includes a polymer selected from the group consisting of polyureas, polyesters, polycarbonates, polyamides, and melamine based polymers and copolymers thereof; and wherein the capsules have an average particle size of no more than 4 µm as determined by dynamic laser diffraction.

The inkjet ink can be a colourless inkjet ink for use as a primer or a varnish, but preferably the inkjet ink contains at least one colorant.

In a preferred embodiment, the inkjet ink according to a preferred embodiment of the invention is part of an inkjet ink set, more preferably part of a multi colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

The inkjet ink set may also include one or more spot colours, preferably one or more corporate colours, such as e.g. the red colour of CocaCola™.

The inkjet ink set may also include a varnish for improving the gloss on certain substrates like textiles.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink is preferably smaller than 25 mPa·s at 25° C. and at a shear rate of 90 s$^{-1}$, more preferably between 2 and 15 mPa·s at 25° C. and at a shear rate of 90 s$^{-1}$.

The surface tension of the inkjet ink is preferably in the range of about 18 mN/m to about 70 mN/m at 25° C., more preferably in the range of about 20 mN/m to about 40 mN/m at 25° C.

The inkjet ink may also contain at least one surfactant for obtaining good spreading characteristics on a substrate.

Capsules

The capsules have a polymeric shell surrounding a core containing reactive chemistry. The capsules are preferably present in the inkjet ink in amount of no more than 27 wt %, preferably between 5 and 25 wt % based on the total weight of the inkjet ink. It was observed that above 27 wt % jetting was not always so reliable.

The capsules have an average particle size of no more than 4 µm as determined by dynamic laser diffraction. The nozzle diameter of inkjet print heads is usually 20 to 35 µm. Reliable inkjet printing is possible if the average particle size of the capsules is five times smaller than the nozzle diameter. An average particle size of no more than 4 µm allows jetting by print heads having the smallest nozzle diameter of 20 µm. In a more preferred embodiment, the average particle size of the capsules is ten times smaller than the nozzle diameter. Hence preferably, the average particle size is from 0.05 to 2 µm, more preferably from 0.10 to 1 µm. When the average particle size of the capsule is smaller than 2 µm, excellent resolution and dispersion stability with time are obtained.

The capsules are dispersed in the aqueous medium of the inkjet ink using a dispersing group covalently bonded to the polymeric shell. The dispersing group is preferably selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

These negatively or positively charged capsule surfaces can also be advantageously used during inkjet printing. For example, a second liquid containing a cationic substance, such as a compound containing ammonium groups, can be used to precipitate capsules and, if polymeric or multivalent cations are used, to bind capsules together by interaction with the dissociated carboxylic acid groups covalently bonded to the polymeric shell. By using this method an improvement in image quality can be observed due to the immobilisation of the capsules.

There is no real limitation on the type of polymer used for the polymeric shell of the capsule. Preferably, the polymer used in the polymeric shell is preferably crosslinked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

Capsules can be prepared using both chemical and physical methods. Suitable encapsulation methodologies include complex coacervation, liposome formation, spray drying and polymerization methods.

In a preferred embodiment of the present invention preferably a polymerization method is used, as it allows the highest control in designing the capsules. More preferably interfacial polymerization is used to prepare the capsules. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerisation is a particularly preferred technology for the preparation of capsules according to the present invention. In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to a preferred embodiment of the present invention are preferably prepared from an oleophilic dispersion in an aqueous continuous phase.

Typical polymeric shells, formed by interfacial polymerisation are selected from the group consisting of polyamides, typically prepared from di- or oligoamines as first shell component and di- or poly-acid chlorides as second shell component, polyurea, typically prepared from di- or oligoamines as first shell component and di- or oligoisocyanates as second shell component, poly(urea-urethanes), typically prepared from di- or oligoamines and di- or oligoalcohols as first shell component and di- or oligoisocyanates as second shell component, polysulfonamides, typically prepared from di- or oligoamines as first shell component and di- or oligosulfochlorides as second shell component, polyesters, typically prepared from di- or oligoalcohols as first shell component and di- or oligo-acid chlorides as second shell component and polycarbonates, typically prepared from di- or oligoalcohols as first shell component and di- or oligo-chloroformates as second shell component. The shell can be composed of combinations of these polymers.

In a further preferred embodiment, polymers, such as gelatine, chitosan, albumin and polyethylene imine can be used as first shell components in combination with a di- or oligo-isocyanate, a di- or oligo acid chloride, a di- or oligo-chloroformate and an epoxy resin as second shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains one or more chemical reactants capable of forming a reaction product upon application of heat and/or light. These one or more chemical reactants, here below also referred to as the "reactive chemistry", are usually incorporated into the capsules by dissolving it in an organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when liquid reactive components, more preferably free radical curable or cationic curable monomers or oligomers having a viscosity of less then 100 mPa·s, are used as chemical reactant in the capsules.

The method for preparing a dispersion of capsules preferably includes the following steps:
a) preparing a non-aqueous solution of a first reactant for forming the polymeric shell and the one or more chemical reactants optionally in an organic solvent having a low miscibility with water and having a lower boiling point than water;
b) preparing an aqueous solution of a second reactant for forming the polymeric shell;
c) dispersing the non-aqueous solution under high shear in the aqueous solution;

d) optionally stripping the organic solvent from the mixture of the aqueous solution and the non-aqueous solution; and
e) preparing a polymeric shell around the one or more chemical reactants by interfacial polymerization of the first and second reactants for forming the polymeric shell.

The capsule dispersion can then be completed into an inkjet ink by addition of e.g. water, humectants, surfactant and the like.

The reactive chemistry in the core of the capsule may be thermally reactive chemistry which is activated directly by heat or activated indirectly using an optothermal converting agent. In the latter, for example an infrared absorbing dye converts the infrared light of an infrared laser or infrared LEDs into heat.

Other additives may be included into the core of the capsule such as, for example, light stabilizers, conductive particles and polymers, magnetic particles, or other compounds suitable for the specific application for which the inkjet ink is used.

Thermal Reactive Chemistry

In a preferred embodiment of the inkjet ink according to the present invention, the one or more chemical reactants include a thermally curable compound. The thermally curable compound is preferably a low molecular, oligomer or polymer compound functionalized with at least one functional group selected from the group consisting of an epoxide, an oxetane, an aziridine, an azetidine, a ketone, an aldehyde, a hydrazide and a blocked isocyanate. In a further preferred embodiment, the thermally curable compound or thermally reactive chemistry is selected from the group consisting of an optionally etherified condensation product of formaldehyde and melamine, an optionally etherified condensation product of formaldehyde and ureum and a phenol formaldehyde resin, preferably a resole.

The thermally reactive chemistry can be a one component or a two component system. A one component system is defined as a reactive system that is capable of forming a polymeric resin or crosslinked network by reacting on its own upon thermal activation. A two component system is defined as a reactive system that is capable of forming a polymeric resin or crosslinked network by reacting with a second component in the system upon thermal activation. The second component can be present in the aqueous continuous phase, in a separate dispersed phase, e.g. in the core of a capsule, on the substrate used for inkjet printing or a combination thereof. Typical two component thermally reactive systems are selected from the group consisting of a ketone or aldehyde and a hydrazide, an epoxide or oxetane and an amine, a blocked isocyanate and an alcohol and a blocked isocyanate and an amine. Blocked isocyanates are particularly preferred.

Synthesis of blocked isocyanates is well-known to the skilled person and has been reviewed by Wicks D. A. and Wicks Z. W. Jr. (Progress in Organic Coatings, 36, 148-172 (1999)) and Delebecq et al. (Chem; Rev., 113, 80-118 (2013)). Classic blocked isocyanates are defined as chemical components that are capable of forming isocyanates from a precursor upon thermal treatment. In general, the reaction can be summarized as given in scheme 1 below.

Scheme 1:

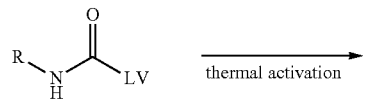

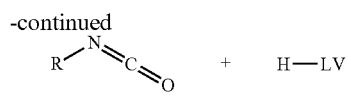

The activation temperature, also called deblocking temperature, is dependent on the leaving group and is selected dependent on the application. Suitable isocyanate precursors are given below having a variable deblocking temperature between 100° C. and 160° C.

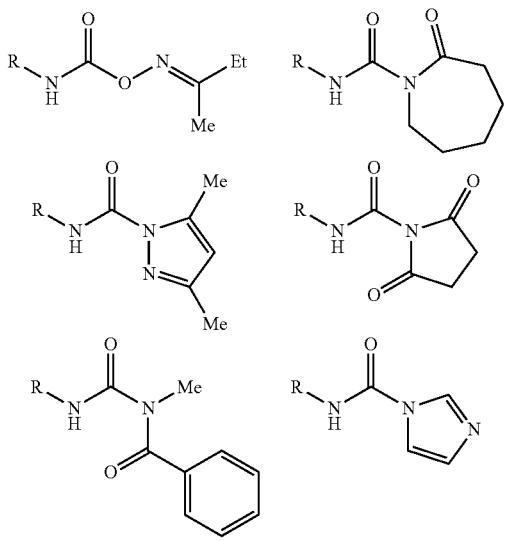

In the above six isocyanate precursors, R represents the residue of a difunctional, multifunctional or polymeric blocked isocyanate. Difunctional and multifunctional blocked isocyanates are preferred. In a further preferred embodiment, R represents a hydrocarbon group, further functionalized with at least one and preferably two or more blocked isocyanates, where the blocked isocyanates can be the same as or different from the first blocked isocyanate listed above. The hydrocarbon group preferably comprises no more then 40 carbon atoms, more preferably no more then 30 carbon atoms and most preferably between 8 and 25 carbon atoms. The same blocked isocyanate functional groups as the first blocked isocyanate are preferred. In a further preferred embodiment R comprises aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

Active methylene compounds as blocking agents are widely used as alternatives for classic blocked isocyanates, operating via an alternative reaction pathway, not yielding an intermediate isocyanate but crosslinking the system via ester formation as disclosed in Progress in Organic Coatings, 36, 148-172 (1999), paragraph 3.8. Suitable examples of active methylene group blocked isocyanates are given below:

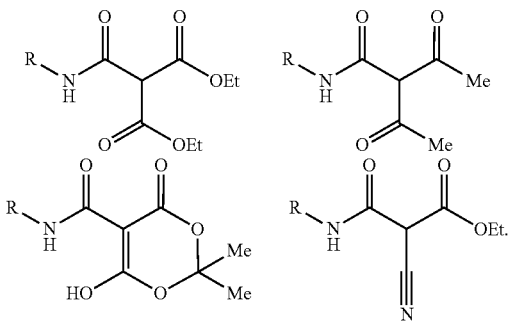

In the above four compounds, R represents the residue of a difunctional, multifunctional or polymeric blocked isocyanate or active methylene group blocked isocyanate. Difunctional and multifunctional blocked isocyanates or active methylene group blocked isocyanates are preferred. In a further preferred embodiment, R represents a hydrocarbon group, further functionalized with at least one and preferably two or more blocked isocyanates or active methylene group blocked isocyanates, where the blocked isocyanates can be the same as or different from the first active methylene group blocked isocyanate listed above. The hydrocarbon group preferably comprises no more then 40 carbon atoms, more preferably no more then 30 carbon atoms and most preferably between 8 and 25 carbon atoms. Di- or multifunctional active methylene group blocked isocyanates are preferred, all blocking functional groups being the same being particularly preferred. In a further preferred embodiment R comprises, aliphatic, cycloaliphatic or aromatic fragments or combinations thereof. Preferred aliphatic fragments are linear or branched saturated hydrocarbon chains comprising 2 to 12 carbon atoms. Preferred cycloaliphatic fragments are five or six membered saturated hydrocarbon rings, six membered hydrocarbon rings being particularly preferred. Preferred aromatic fragments are selected from the group consisting of phenyl rings and naphtyl rings, phenyl rings being particularly preferred. In a particularly preferred embodiment R comprises at least one fragment selected from the group consisting of a [1,3,5]triazinane-2,4,6-trione fragment and a biuret fragment.

In a preferred embodiment, the blocked isocyanate is a polyfunctional blocked isocyanate having two to six blocked isocyanate functions. Tri- and tetrafunctional blocked isocyanates are particularly preferred.

Preferred blocked isocyanates are precursors capable of forming a di- or multifunctional isocyanate upon thermal activation selected from the group of hexamethylene diisocyanate, isophorone diisocyanate, tolyl diisocyanate, xylylene diisocyanate, a hexamethylene diisocyanate trimer, trimethylhexylene diisocyanate, diphenylmethane diisocyanate, dicyclohexylmethane diisocyanate and condensation products of one or more of the previous isocyanates. Other preferred blocked isocyanates are derivatives from the Takenate™ series of isocyanates (Mitsui), the Duranate™ series (Asahi Kasei Corporation) and the Bayhydur™ series (Bayer AG).

Suitable blocked isocyanates can be selected from the Trixene™ series (Baxenden Chemicals LTD) and the Bayhydur™ series (Bayer AG). Preferred examples of blocked isocyanates are given below in Table 1 without being limited thereto.

TABLE 1

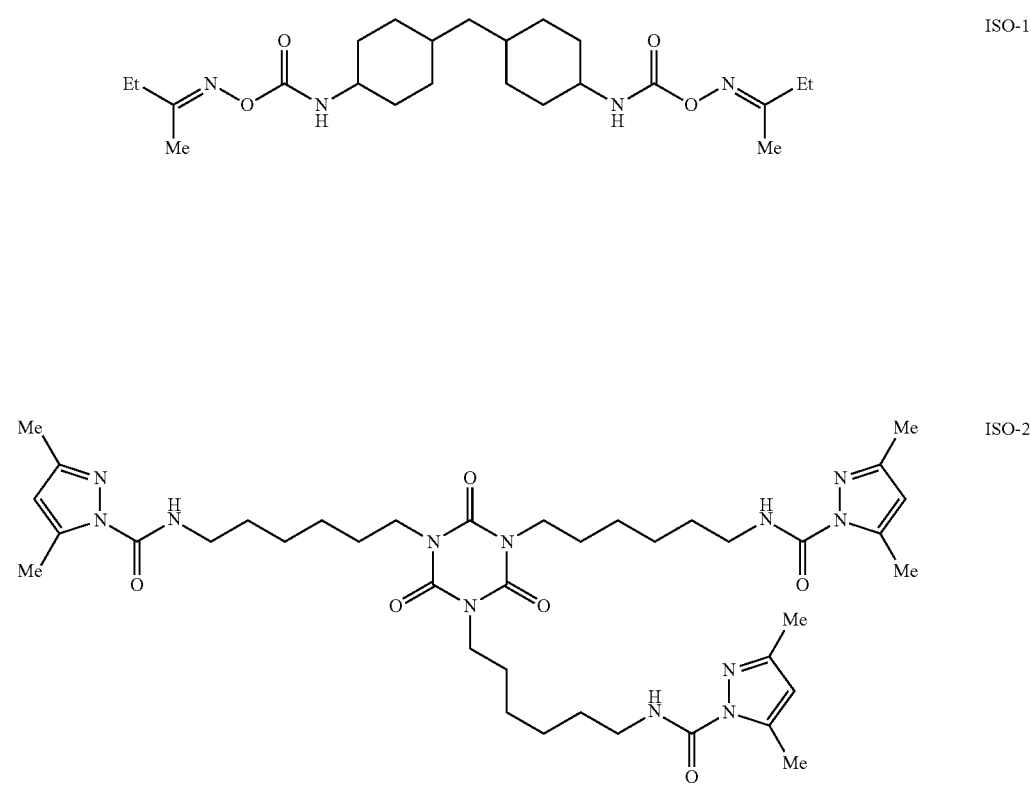

TABLE 1-continued
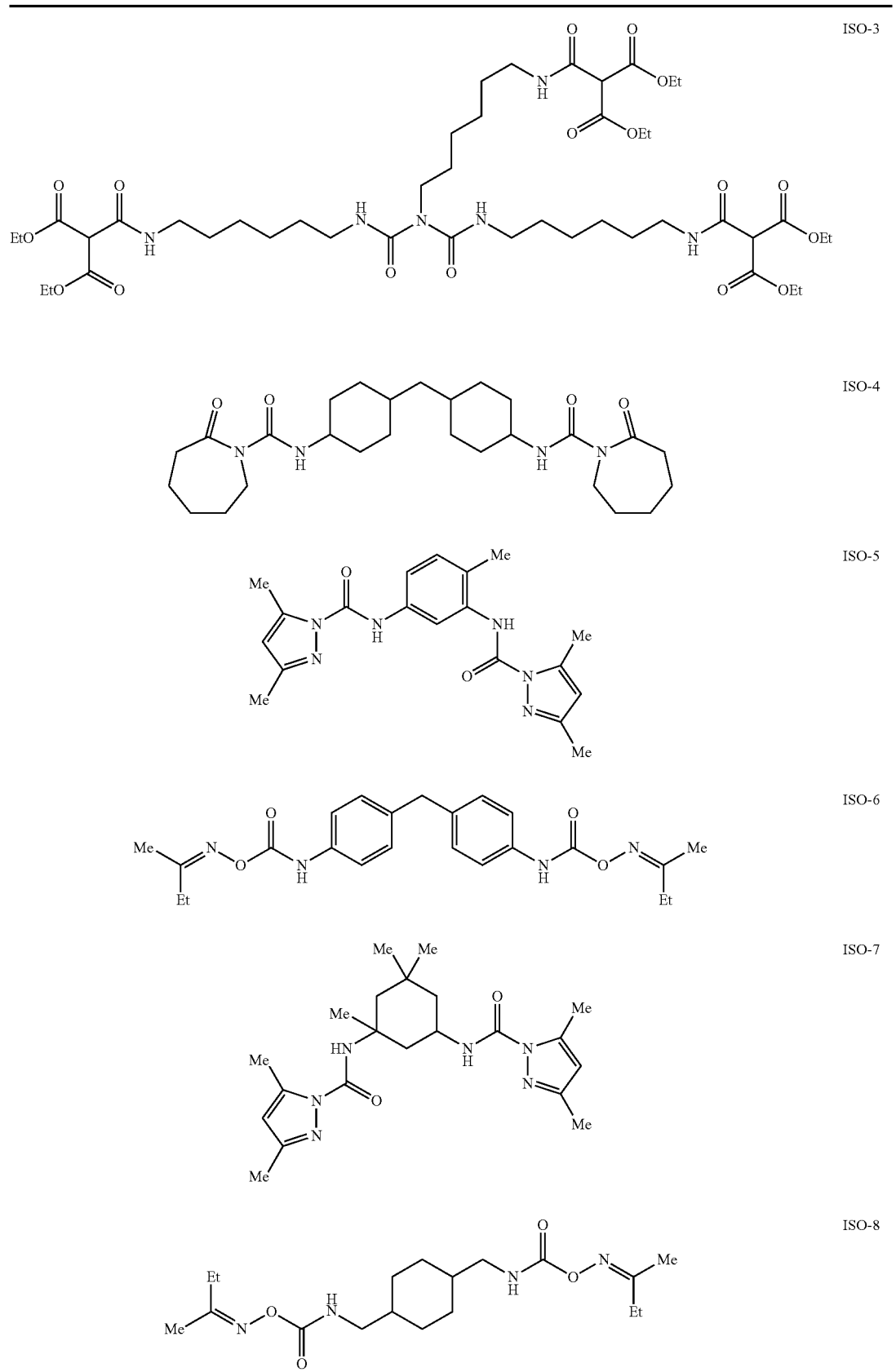

TABLE 1-continued

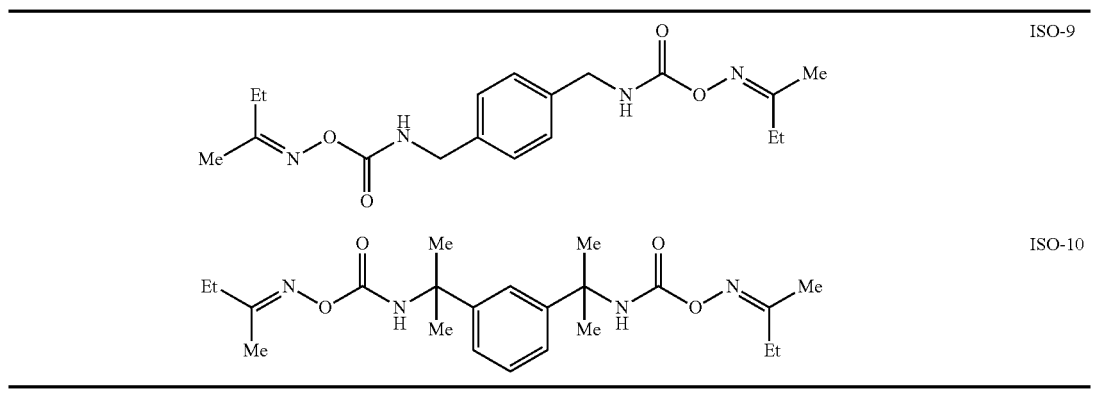

In a further preferred embodiment, the inkjet ink according to the present invention may further comprise a catalyst to activate said thermally reactive chemistry. The catalyst is preferably selected from the group consisting of a Brönsted acid, a Lewis acid and thermal acid generator. Said catalyst can be present in the aqueous continuous phase, in the core of the capsule or in a separate dispersed phase.

Light Curable Reactive Chemistry

The reactive chemistry in the core may also be responsive to light, such as UV light. UV curable reactive chemistry contains one or more chemical reactants, such as a monomer, oligomer or polymer, which are curable by free radical polymerization or by cationic polymerization. In a preferred embodiment, the monomer, oligomer or polymer includes at least one acrylate group as polymerizable group.

In addition to the monomer, oligomer or polymer that are curable by free radical polymerization or by cationic polymerization in the core of the capsule, water soluble monomers and oligomers may also be included into the aqueous medium.

The inkjet ink preferably includes at least one photoinitiator. Although water soluble or water dispersible photoinitiators may be used in the aqueous medium, preferably the at least one photoinitiator is present in the core of the capsule. Preferably also at least one co-initiator is present in the inkjet ink. Similarly the at least one co-initiator may be present in the aqueous medium, but is preferably present in the core of the capsule.

Any polymerizable compound commonly known in the art may be employed. A combination of monomers, oligomers and/or polymers may be used. The monomers, oligomers and/or polymers may possess different degrees of functionality, and a mixture including combinations of mono-, di-, tri- and higher functionality monomers, oligomers and/or polymers may be used.

Particularly preferred for use as a free radical curable compound in the inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and ethoxylated or propoxylated trimethylolpropane triacrylate.

Other higher functional acrylates include ditrimethylolpropane tetraacrylate, dipentaerythritol pentaacrylate, ethoxylated pentaeryhtitol tetraacrylate, methoxylated glycol acrylates and acrylate esters.

Furthermore, methacrylates corresponding to the above-mentioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet ink may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, b-methylstyrene, p-methyl-b-methylstyrene, a-methylstyrene and p-methoxy-b-methylstyrene.

Suitable examples of vinylnaphthalene compounds are 1-vinylnaphthalene, a-methyl-1-vinylnaphthalene, b-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

In a preferred embodiment, the free curable compound in the inkjet ink includes at least one monomer selected from the group consisting of N-vinyl caprolactam, phenoxyethyl acrylate, dipropyleneglycoldiacrylate, ethoxylated trimethylolpropane triacrylate, pentaerythritol tetraacrylate, and cyclic trimethylolpropane formal acrylate.

The polymerizable compound may also be a cationically polymerizable compound. Suitable examples of cationically curable compounds can be found in Advances in Polymer Science, 62, pages 1 to 47 (1984) by J. V. Crivello.

The cationic curable compound may contain at least one olefin, thioether, acetal, thioxane, thietane, aziridine, N, O, S or P heterocycle, aldehyde, lactam or cyclic ester group.

Examples of cationic polymerizable compounds include monomers and/or oligomers epoxides, vinyl ethers, styrenes, oxetanes, oxazolines, vinylnaphthalenes, N-vinyl heterocyclic compounds, tetrahydrofurfuryl compounds.

Suitable cationic curable compounds having at least one epoxy group are listed in the "Handbook of Epoxy Resins" by Lee and Neville, McGraw Hill Book Company, New York (1967) and in "Epoxy Resin Technology" by P. F. Bruins, John Wiley and Sons New York (1968).

Examples of cationic curable compounds having at least one epoxy group include 1,4-butanediol diglycidyl ether, 3-(bis(gycidyloxymethyl)methoxy)-1,2-propane diol, limonene oxide, 2-biphenyl gycidyl ether, 3,4-epoxycyclohexyl-methyl-3',4'-epoxycyclohexane carboxylate, epichlorohydrin-bisphenol S based epoxides, epoxidized styrenics and more epichlorohydrin-bisphenol F and A based epoxides and epoxidized novolaks.

Suitable epoxy compounds comprising at least two epoxy groups in the molecule are alicyclic polyepoxide, polyglycidyl ester of polybasic acid, polyglycidyl ether of polyol, polyglycidyl ether of polyoxyalkylene glycol, polyglycidyl ester of aromatic polyol, polyglycidyl ether of aromatic polyol, urethane polyepoxy compound, and polyepoxy polybutadiene.

Examples of cycloaliphatic diepoxides include copolymers of epoxides and hydroxyl components such as glycols, polyols, or vinyl ether, such as 3,4-epoxycyclohexylmethyl-3', 4'-epoxycyclohexylcarboxylate; bis (3,4-epoxycylohexylmethyl) adipate; limonene diepoxide; diglycidyl ester of hexahydrophthalic acid.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, a-methylphenyl vinyl ether, b-methylisobutyl vinyl ether and b-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate,4-(vinyloxy)butyl steatite, bis [4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl]methylenedi-4,1-phenylene) biscarbamate and 3-amino-1-propanol vinyl ether.

Suitable examples of oxetane compounds having at least one oxetane group include 3-ethyl-3-hydroloxymethyl-1-oxetane, the oligomeric mixture 1,4-bis [3-ethyl-3-oxetanyl methoxy)methyl]benzene, 3-ethyl-3-phenoxymethyl-oxetane, bis ([1-ethyl(3-oxetanil)]methyl) ether, 3-ethyl-3-[(2-ethylhexyloxy) methyl]oxetane, 3-ethyl-[(tri-ethoxysilyl propoxy)methyl]oxetane and 3,3-dimethyl-2(p-methoxyphenyl)-oxetane.

If the one or more chemical reactants in the core of the capsule are one or more free radical curable compounds, then the photoinitiator is a Norrish Type I or II photoinitiator. If the one or more chemical reactants in the core of the capsule are one or more cationically curable compounds, then the photoinitiator is a cationic photoinitiator.

The photoinitiator is preferably a free radical initiator. Two types of free radical photoinitiators can be distinguished and used in the inkjet inks of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™KIP150, Esacure™ K137 and Esacure™ EDB available from LAMBERTI, H-Nu™ 470 and H-Nu™ 470X available from SPECTRA GROUP Ltd.

For safety reasons, the photoinitiator is preferably a so-called diffusion hindered photoinitiator. A diffusion hindered photoinitiator is a photoinitiator which exhibits a much lower mobility in a cured layer of the curable inkjet ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of multifunctional photoinitiators, oligomeric, photoinitiators, polymeric photoinitiators and polymerizable photoinitiators. Most preferably the diffusion hindered photoinitiator is a polymerizable initiator or a polymeric photoinitiator.

Suitable diffusion hindered photoinitiators are also those disclosed in EP 2053101 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

If the core of the capsule contains one or more cationically radical curable compounds, then the core contains at least one cationic photoinitiator. A cationic photoinitiator is a compound that generates acid and initiates cationic polymerization upon irradiation by UV light. Any known cationic photoinitiator may be used. The cationic photoinitiator may be used alone as a single initiator or as a mixture of two or more initiators.

Suitable photocationic polymerization initiators include diazonium salts, phosphonium salts, sulfonium salts, iodonium salts, imide sulfonates, oxime sulfonates, diazo disulfones, disulfones, and o-nitrobenzyl sulfonates. Examples of these cationic photoinitiators are described in US 2006222832 A (FUJI), U.S. Pat. No. 3,779,778 (3M) and US 2008055379 A (KONICA).

A preferred amount of the one or more free radical and/or cationic photoinitiators is 0-30 wt %, more preferably 0.1-20 wt %, and most preferably 0.3-15 wt % of the total weight of the polymerizable composition.

In order to increase the photosensitivity further, the free radical curable inkjet ink may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).
The preferred co-initiators are aminobenzoates.

The one or more co-initiators included into the radiation curable inkjet ink are preferably diffusion hindered co-initiators for safety reasons. A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators.

The free radical curable inkjet ink preferably comprises a co-initiator in an amount of 0.1 to 50 wt %, more preferably in an amount of 0.5 to 25 wt %, most preferably in an amount of 1 to 10 wt % of the total weight of the polymerizable composition The free radical curable inkjet ink may further also contain at least one inhibitor for improving the thermal stability of the polymerizable composition in the core of the capsule.

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol, 2,6-di-tert.butyl-4-methylphenol (=BHT) may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

The inhibitor is preferably a polymerizable inhibitor.

Since excessive addition of these polymerization inhibitors may lower the curing speed, it is preferred that the amount capable of preventing polymerization is determined prior to blending. The amount of a polymerization inhibitor is preferably lower than 5 wt %, more preferably lower than 3 wt % of the total free radical or cationically curable composition.

Aqueous Medium

The capsules are dispersed into an aqueous medium. The aqueous medium may consist of water, but preferably include one or more organic solvents. Other compounds, such as e.g. monomers and oligomers, surfactants, colorants, alkaline compounds and light stabilizers, may be dissolved or dispersed in the aqueous medium.

The one or more organic solvents may be added for a variety of reasons. For example, it can be advantageous to add a small amount of an organic solvent to improve the dissolution of a compound in the aqueous medium.

The aqueous medium may contain at least one humectant to prevent the clogging of the nozzle, due to its ability to slow down the evaporation rate of inkjet ink, especially the water in the inkjet ink. The humectant is an organic solvent having a higher boiling point than water.

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the ink-jet ink formulation in an amount of 0.1 to 20 wt % based on the total weight of the inkjet ink.

The aqueous medium preferably includes at least one surfactant. The surfactant can be anionic, cationic, non-ionic, or zwitter-ionic and is preferably added in an amount below 10 wt %, more preferably below 5 wt % based on the total inkjet ink weight.

Suitable surfactants include fatty acid salts, ester salts of a higher alcohol, alkylbenzene sulphonate salts, sulphosuccinate ester salts and phosphate ester salts of a higher alcohol (e.g. sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 440, 465 and TG available from AIR PRODUCTS & CHEMICALS INC.

A biocide may be added to the aqueous medium to prevent unwanted microbial growth, which may occur in the ink-jet ink over time. The biocide may be used either singly or in combination.

Suitable biocides for the ink-jet ink include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the inkjet ink.

The aqueous medium may further comprise at least one thickener for viscosity regulation in the inkjet ink.

Suitable thickeners include urea or urea derivatives, hydroxyethylcellulose, carboxymethylcellulose, hydroxypropylcellulose, derived chitin, derived starch, carrageenan, pullulan, proteins, poly(styrenesulphonic acid), poly(styrene-co-maleic anhydride), poly(alkyl vinyl ether-co-maleic anhydride), polyacrylamid, partially hydrolyzed polyacrylamid, poly(acrylic acid), poly(vinyl alcohol), partially hydrolyzed poly(vinyl acetate), poly(hydroxyethyl acrylate), poly(methyl vinyl ether), polyvinylpyrrolidone, poly (2-vinylpyridine), poly(4-vinylpyridine) and poly(diallyldimethylammonium chloride).

The thickener is added preferably in an amount of 0.01 to 20 wt %, more preferably 0.1 to 10 wt % based on the inkjet ink.

The inkjet ink according to a preferred embodiment of the present invention may further comprise at least one antioxidant for improving the storage stability of an image.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP 62215272 A (FUJI).

The stabilizer is added in an amount of 0.1 to 30 wt %, preferably 1 to 10 wt % based on the total weight of the inkjet ink.

The aqueous medium may contain at least one pH adjuster. Suitable pH adjusters include organic amines, NaOH, KOH, NEt$_3$, NH$_3$, HCl, HNO$_3$ and H$_2$SO$_4$. In a preferred embodiment, the inkjet ink has a pH higher than 7. A pH of 7, 8 or more can advantageously influence the electostatic stabilization of the capsules, especially when the dispersing groups are carboxylic acid groups.

The aqueous medium may also includes polymeric latex particles. There is no limitation on the type of polymeric latex used in the aqueous medium. The polymer latex is preferably a self-dispersible latex, i.e. having ionic or ionizable groups such as e.g. the dispersing groups of the capsules.

The polymer latex may be selected from an acrylate based latex, a styrene based latex, polyester based latex, and a polyurethane based latex. The polymer latex is preferably a polyurethane latex, more preferably a self-dispersible polyurethane latex. The term "polyurethane based" means that the majority of the polymer in the polymer latex consists of polyurethane. Preferably at least 50 wt %, more preferably at least 70 wt % of the polymer in the polyurethane latex consists of polyurethane.

In a particularly preferred embodiment, the aqueous medium contains inter-crosslinkable latex particles, more preferably inter-crosslinkable polyurethane based latex particles.

Suitable examples of inter-crosslinkable latex particles are disclosed by EP 2467434 A (HP), however preferably the inter-crosslinking is obtained using (meth)acrylate groups, especially when the reactive chemistry in the core of the capsules is UV curable reactive chemistry.

Preferably a crosslinker is used to crosslink the polymerized monomers of the latex particles in order to enhance the durability of the latex particle. The crosslinker may be a separate compound or can be a cross-linking monomer. For example, in a (partly) acrylate based latex, the crosslinker may be a polyfunctional monomer or oligomers such as, without limitation, ethylene glycol dimethacrylate, diethylene glycol dimethacrylate, ethylene glycol diacrylate, diethylene glycol diacrylate, 1,6-hexanediol diacrylate, tetraethylene glycol diacrylate, tripropylene glycol diacrylate, ethoxylated bisphenol A diacrylate, pentaerythritol tri- and tetraacrylate, N,N'-methylenebisacrylamide, divinylbenzene, and mixtures thereof. When present, the crosslinkers preferably comprise from 0.1 wt % to 15 wt % of the polymerized monomers.

The polymer latex in a preferred embodiment of the invention is preferably a self-dispersing polymer latex, and more preferably a self-dispersing polymer latex having a carboxyl group. A self-dispersing polymer latex means that it does not require a free emulsifier and that they can get into a dispersed state in an aqueous medium even in the absence of other surfactants due to a functional group, preferably an acidic group or a salt thereof, covalently bonded tot the latex. In preparing a self-dispersing polymer latex, preferably a monomer is used containing a carboxylic acid group, a sulfonic acid group or a phosphoric acid group.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

The latex preferably has a glass transition temperature (Tg) of no more than 70° C., more preferably no more than 50° C.

The minimum film-forming temperature (MFT) of the polymer latex is preferably between −50 and 70° C., more preferably between −40 and 50° C.

The average particle size of the latex particles in the inkjet ink is preferably less than 300 nm, more preferably less than 200 nm as measured by laser diffraction, e.g. using a Beckman Coulter™ LS 13320.

Colorants

The colorants used in the inkjet ink may be dyes, pigments or a combination thereof. Organic and/or inorganic pigments may be used.

The colorant for use is not particularly limited, and may be selected properly from various known colorants according to applications. For example, use of a pigment is preferable for forming an image superior in light fading and weather resistance. On the contrary, use of a dye is preferable, for forming an image superior in transparency on a transparent film. Either a water- or oil-soluble dye may be used as the dye. Preferably the dye is an oil-soluble dye because it can be incorporated in the core of the capsule, and exhibited a much better water resistance than images printed with water soluble dyes in the aqueous medium. In fact it has been observed that colorants, such as disperse dyes, are well protected when incorporated into the core of the capsule even against aggressive chemicals like hypochlorite. The latter can be exploited in inkjet printing on textiles for allowing thorough cleaning with concentrated detergents.

The colorant is preferably a pigment or a polymeric dye for reasons of light fastness.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

An advantage of including the pigments in the core of the capsule, is that high dispersion stability of the pigment is not really necessary as the dispersion stability is accomplished by the capsules in the inkjet ink. As long as pigments are dispersed sufficiently to be handled in the capsule formation process, there is no need to optimize dispersion stability.

Alternatively the pigment particles can be included in the aqueous medium. The colour pigment can be dispersed using a polymeric dispersant, but preferably a self-dispersible pigment is used. The latter prevents interaction of the polymeric dispersant with the dispersing groups of the capsules in the inkjet ink, since dispersion stability of the pigment is accomplished by the same technique of electrostatic stabilization as employed for the capsules.

A self-dispersible pigment is a pigment having on its surface covalently bonded anionic or cationic hydrophilic groups, such as salt-forming groups or the same groups used as dispersing groups for the capsules, that allow the pigment to be dispersed in an aqueous medium without using a surfactant or a resin.

The technology for making self-dispersible pigments is well-known. For example, EP 1220879 A (CABOT) discloses pigments having attached a) at least one steric group and b) at least one organic ionic group and at least one amphiphilic counterion, wherein the amphiphilic counterion has a charge opposite to that of the organic ionic group that are suitable for inkjet inks. Also EP 906371 A (CABOT) discloses suitable surface-modified coloured pigment having attached hydrophilic organic groups containing one or more ionic groups or ionizable groups. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The ink is diluted with ethyl acetate to a pigment concentration of 0.002 wt %. The measurement settings of the BI90plus are: 5 runs at 23° C., angle of 90°, wavelength of 635 nm and graphics=correction function However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

Also special colorants may be used, such as fluorescent pigments for special effects in clothing, and metallic pigments for printing a luxury look of silver and gold colours on textiles.

If the colour pigment is included in the core of the capsule, a polymeric dispersant is advantageously used for dispersion stability and handling during manufacturing of the capsules.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from ZENECA. A detailed list of non-polymeric as well as some polymeric dispersants is disclosed by M C CUTCHEON. Functional Materials, North American Edition. Glen Rock, N.J.: Manufacturing Confectioner Publishing Co., 1990. p. 110-129.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 15%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

Generally dyes exhibit a higher light fading than pigments, but cause no problems on jettability.

Dyes suitable for the inkjet ink according to a preferred embodiment of the present invention include direct dyes, acidic dyes, basic dyes, solvent dyes and reactive dyes.

Suitable direct dyes for the ink-jet ink according to a preferred embodiment of the present invention include C.I. Direct Yellow 1, 4, 8, 11, 12, 24, 26, 27, 28, 33, 39, 44, 50, 58, 85, 86, 100, 110, 120, 132, 142, and 144; C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343; C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237; and C.I. Direct Black 2, 3, 7, 17, 19, 22, 32, 38, 51, 56, 62, 71, 74, 75, 77, 105, 108, 112, 117, and 154.

Suitable acidic dyes for the ink-jet ink according to a preferred embodiment of the present invention include C.I. Acid Yellow 2, 3, 7, 17, 19, 23, 25, 20, 38, 42, 49, 59, 61, 72, and 99; C.I. Acid Orange 56 and 64; C.I. Acid Red 1, 8, 14, 18, 26, 32, 37, 42, 52, 57, 72, 74, 80, 87, 115, 119, 131, 133, 134, 143, 154, 186, 249, 254, and 256; C.I. Acid Violet 11, 34, and 75; C.I. Acid Blue 1, 7, 9, 29, 87, 126, 138, 171, 175, 183, 234, 236, and 249; C.I. Acid Green 9, 12, 19, 27, and 41; and C.I. Acid Black 1, 2, 7, 24, 26, 48, 52, 58, 60, 94, 107, 109, 110, 119, 131, and 155;

Suitable reactive dyes for the ink-jet ink according to a preferred embodiment of the present invention include C.I. Reactive Yellow 1, 2, 3, 14, 15, 17, 37, 42, 76, 95, 168, and 175; C.I. Reactive Red 2, 6, 11, 21, 22, 23, 24, 33, 45, 111, 112, 114, 180, 218, 226, 228, and 235; C.I. Reactive Blue 7, 14, 15, 18, 19, 21, 25, 38, 49, 72, 77, 176, 203, 220, 230, and 235; C.I. Reactive Orange 5, 12, 13, 35, and 95; C.I. Reactive Brown 7, 11, 33, 37, and 46; C.I. Reactive Green 8 and 19; C.I. Reactive Violet 2, 4, 6, 8, 21, 22, and 25; and C.I. Reactive Black 5, 8, 31, and 39.

Suitable basic dyes for the ink-jet ink according to a preferred embodiment of the present invention include C.I. Basic Yellow 11, 14, 21, and 32; C.I. Basic Red 1, 2, 9, 12, and 13; C.I. Basic Violet 3, 7, and 14; and C.I. Basic Blue 3, 9, 24, and 25.

In a preferred embodiment the dyes are disperse dyes. Disperse dyes are water insoluble dyes and are the only dyes that dye polyester and acetate fibres. Such dyes are especially useful as they can easily be incorporated into the core of the capsules. A disperse dye molecule is based on an azobenzene or anthraquinone molecule with nitro, amine, hydroxyl, etc. groups attached to it.

Suitable examples of disperse dyes include Disperse Red 1, Disperse Orange 37, Disperse Red 55, and Disperse Blue 3. These colorants can be used as a single component, or they can be mixed with more than one colorant of the same or different types to enhance the image quality.

As disperse dyes to be used for the ink, known disperse dyes can be used, specifically including C.I.Disperse Yellow 42, 49, 76, 83, 88, 93, 99, 114, 119, 126, 160, 163, 165, 180, 183, 186, 198, 199, 200, 224 and 237, C.I.Disperse Orange 29, 30, 31, 38, 42, 44, 45, 53, 54, 55, 71, 73, 80, 86, 96, 118 and 119, C.I.Disperse Red 73, 88, 91, 92, 111, 127, 131, 143, 145, 146, 152, 153, 154, 179, 191, 192, 206, 221, 258, 283, 302, 323, 328 and 359, C.I.Disperse Violet 26, 35, 48, 56, 77 and 97, C.I.Disperse Blue 27, 54, 60, 73, 77, 79, 79:1, 87, 143, 165, 165:1, 165:2, 181, 185, 197, 225, 257, 266, 267, 281, 341, 353, 354, 358, 364, 365, and 368, and the like, and dyes suitable to satisfy required hue and fastnesses in the application can be used.

For inkjet printing on textile sublimation, dye diffusion, and heat disperse dye colorants are especially preferred because they have a high affinity to certain synthetic polymeric or resinous materials.

Preferably a set of inkjet inks containing disperse dyes is used, for example a CMYK inkjet ink set.

A preferred cyan inkjet ink ("C" ink) contains a disperse dye selected from the group consisting of C.I. Disperse Blue 27, C.I. Disperse Blue 60, C.I. Disperse Blue 73, C.I. Disperse Blue 77, C.I. Disperse Blue 77:1, C.I. Disperse Blue 87, C.I. Disperse Blue 257, C.I. Disperse Blue 367 and mixtures thereof.

A preferred magenta inkjet ink ("M" ink) contains a magenta disperse dye colorant selected from the group consisting of C.I. Disperse Red 55, C.I. Disperse Red 60, C.I. Disperse Red 82, C.I. Disperse Red 86, C.I. Disperse Red 86:1, C.I. Disperse Red 167:1, C.I. Disperse Red 279 and mixtures thereof.

A preferred yellow inkjet ink ("Y" ink) contains a yellow disperse dye colorant selected from the group consisting of C.I. Disperse Yellow 64, C.I. Disperse Yellow 71, C.I. Disperse Yellow 86, C.I. Disperse Yellow 114, C.I. Disperse Yellow 153, C.I. Disperse Yellow 233, C.I. Disperse Yellow 245 and mixtures thereof.

A preferred black inkjet ink ("K" ink) contains a black disperse dye or a mixture of differently coloured disperse dyes chosen such that the mixture is black in colour.

The inkjet ink set preferably contains other coloured inkjet inks, more preferably at least one inkjet ink containing a disperse dye selected form the group consisting of C.I. Disperse Violet 26, C.I. Disperse Violet 33, C.I. Disperse Violet 36, C.I. Disperse Violet 57, C.I. Disperse Orange 30, C.I. Disperse Orange 41, C.I. Disperse Orange 61 and mixtures thereof.

The pigments and/or dyes are preferably present in the range of 0.1 to 20 wt % based on the total weight of the inkjet ink.

Optothermal Converting Agents

The inkjet ink, preferably the core of the capsules, may contain an optothermal converting agent for the conversion of electromagnetic radiation into heat when the inkjet printed image is exposed to an infrared light source, such as a laser, a laser diode or a LED.

The optothermal converting agent may be any suitable compound absorbing in the wavelength range of emission by the infrared light source.

The optothermal converting agent is preferably an infrared dye as this allows easy handling into the inkjet ink. The infrared dye may be included into the aqueous medium, but is preferably included in the core of the capsule. In the latter, the heat transfer is usually much more effective.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The one or more optothermal converting agents are preferably present in the range of 0.1 to 10 wt % based on the total weight of the inkjet ink.

Inkjet Printing Methods

An inkjet printing method according to a preferred embodiment of the present invention includes at least the steps of: a) jetting an inkjet ink as described above on a substrate; and b) applying heat and/or light to form a reaction product from the one or more chemical reactants in the capsules.

In a preferred embodiment, the inkjet printing method includes at least the steps of: a) jetting on a textile an inkjet ink containing one or more thermal reactive chemical reactants in a capsule have an average particle size of no more than 4 µm; and b) applying heat to form a reaction product from the one or more thermal reactive chemical reactants in the capsules. The heat treatment, i.e. time and temperature, is adjusted to the type of textile and the reactivity of the thermal chemistry.

In another preferred embodiment, the inkjet printing method includes at least the steps of: a) jetting on substrates for pharmaceutical or food packaging an inkjet ink containing one or more UV curable chemical reactants in a capsule have an average particle size of no more than 4 µm; and b) applying UV radiation to form a reaction product from the one or more UV curable reactive chemical reactants in the capsules, wherein the capsule contains at least one photoinitiator, preferably a diffusion hindered photoinitiator, more preferably a polymeric or polymerizable photoinitiator.

Food packaging is understood to include also packaging for liquids and drinks like milk, water, coke, beer, vegetable oil and the like. Preferred embodiments of the invention are advantageously used for providing food packaging, especially "primary" food packaging. Primary food packaging is the material that first envelops the product and holds it. This usually is the smallest unit of distribution or use and is the package which is in direct contact with the contents. Of course, for reasons of food safety, the radiation curable compositions and inkjet inks may also be used for secondary and tertiary packaging. Secondary packaging is outside the primary packaging, perhaps used to group primary packages together. Tertiary packaging is used for bulk handling, warehouse storage and transport shipping. The most common form of tertiary packaging is a palletized unit load that packs tightly into containers.

There is no real limitation on the type of substrate for inkjet printing one or more inkjet inks of the invention on. The substrates may have ceramic, metallic, glass, wood, paper or polymeric surfaces for printing. The substrate may also be primed, e.g. by a white ink.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of $1.10$ g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

A major advantage of the current inkjet printing method is that not only a wide range of textiles can be printed upon, but that after the fixation process (heat treatment) no post-treatments are necessary. For example, a classic washing process to remove dyes that are unfixed from the textile is not necessary. In addition, also many pre-treatments of textiles can be avoided. For example, where classic inkjet printing processes require the application of a water-soluble polymer to the textile prior to inkjet printing in order to prevent ink bleeding, this is usually not necessary with inkjet inks of the present invention containing capsules. The avoidance of these pre- and post treatment speed-up and simplify the manufacturing of inkjet printed textiles, resulting in an economical bonus. For example, no cumbersome ink swaps have to be performed in the inkjet printer, when changing the type of textile substrate. Also waste generated in the post-treatment can be avoided.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

The inkjet inks of a preferred embodiment of the invention are also suitable for inkjet printing on leather.

Inkjet Printing Devices

The inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type, a thermal print head type and a valve jet type.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The inkjet printer normally contains a drying unit for removing water and organic solvents in the inkjet printed image. However, sometimes this may be combined with the curing device for curing the UV or thermal reactive chemistry in the capsules. For example, if high or low pressure mercury lamp are used as UV light source, they tend to emit so much heat radiation that it is sufficient for removing water and organic solvents in the inkjet printed image.

Alternatively, the inkjet printer may include only the drying unit for removing water and organic solvents in the inkjet printed image, while the UV or thermal curing energy is applied afterwards, i.e. the UV or thermal curing devices are located offline.

An inkjet ink according to a preferred embodiment of the present invention containing UV curable reactive chemistry in the capsules can be cured by exposure to ultraviolet radiation. The curing device may be arranged in combination with the print head of the inkjet printer, travelling therewith so that the curing radiation is applied very shortly after jetting. Preferably such curing devices consist of one or more UV LEDs because in such an arrangement, it can be difficult to provide other types of curing devices that are small enough to be connected to and travelling with the print head. Therefore, a static fixed radiation source may be employed, e.g. a source of curing UV-light, connected to the radiation source by a flexible radiation conductor such as a fibre optic bundle or an internally reflective flexible tube. Alternatively, the actinic radiation may be supplied from a fixed source to the radiation head by an arrangement of mirrors including a mirror upon the print head.

However, it is not necessary to have the UV light source connected to the print head. The source of UV radiation may, for example, also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

If thermal devices are required for curing the thermal reactive chemistry, then the inkjet printer is preferably equipped with some kind of heat radiation device, e.g. an oven, or an infrared light source, such as an infrared laser, one or more infrared laser diodes or infrared LEDs.

The thermal device may also be located offline, e.g. as part of a production line for textiles.

EXAMPLES

Measurement Methods

Surface Tension

The static surface tension of the radiation curable inks was measured with a KRÜSS tensiometer K9 from KRÜSS GmbH, Germany at 25° C. after 60 seconds.

Viscosity

The viscosity of the inkjet ink was measured using a Brookfield DV-II+ viscometer at 25° C. at 12 rotations per minute (RPM) using a CPE 40 spindle. This corresponds to a shear rate of 90 s$^{-1}$.

UV Curing

The inventive radiation curable compositions and the comparative radiation curable compositions were coated on a 300 µm aluminium substrate using a bar coater and a 20 µm wired bar. All coated samples were cured were cured using a Fusion DRSE-120 conveyer, equipped with a Fusion VPS/1600 lamp (D-bulb). The samples were cured using a belt speed of 20 m/min and at full power of the lamp. Each sample was passed five times under the lamp.

Materials

All materials used in the following examples were readily available from standard sources such as Sigma-Aldrich (Belgium) and Acros (Belgium) unless otherwise specified. The water used was demineralized water.

Trixene™ B17982 was supplied by Baxenden Chemicals LTD.

Takenate™ D110N was supplied by Mitsui Chemicals Inc.;

Dye-1 has been prepared according to the following procedure:

the synthesis of the aniline:

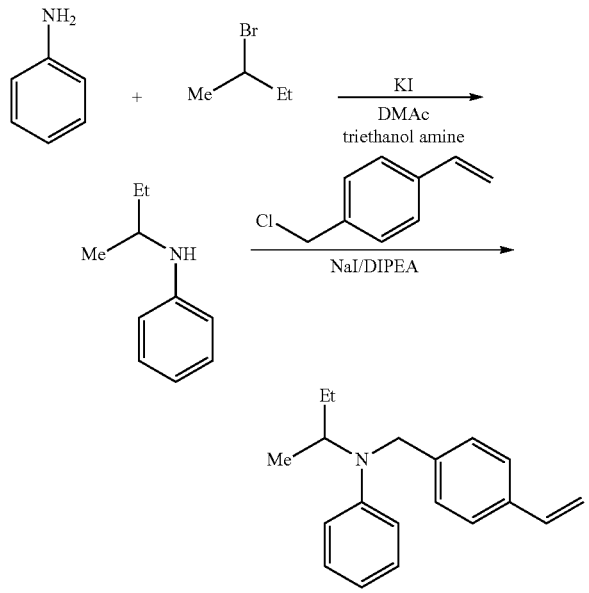

398.4 g (2.4 mol) potassium iodide was added to 400 ml dimethyl acetamide. The mixture was heated to 65° C. and 329 g (2.4 mol) 2-bromo-butane was added. The mixture was stirred at 70° C. for one hour. The mixture was heated to 78° C. and a mixture of 148.8 g (1.6 mol) aniline and 310.4 g (2.08 mol) triethanol amine was added over two hours, while keeping the temperature at 78° C. The reaction was allowed to continue for three hours at 78-80° C. 800 ml water and 200 ml ethyl acetate were added and the mixture was stirred for 15 minutes. The mixture was kept at 50° C. and the organic fraction was isolated. The organic fraction was washed twice with 400 ml water and all solvents were removed under reduced pressure at 75° C. 222 g of isobutyl aniline was isolated (y: 93%, TLC analysis on TLC Silica gel 60F$_{254}$, supplied by Merck, using methylene chloride as eluent: R$_f$: 0.5). The crude isobutyl aniline was used without further purification. 36.6 g (0.24 ml) chloromethyl styrene, 30 g (0.20 mol) isobutyl aniline 32.3 g (0.25 mol) ethyl-di-isopropyl amine and 1 g (0.006 mol) potassium iodide were dissolved in 80 ml dimethyl acetamide. The mixture was heated to 100° C. and the reaction was allowed to continue for 2 hours at 100° C. The reaction mixture was allowed to cool down to room temperature and poured into 1 l water. The mixture was extracted with 200 ml methylene chloride. The organic fraction was isolated, dried over MgSO$_4$ and evaporated under reduced pressure. The crude product was purified using preparative column chromatography, on a Macherey Nagel Chromabond Flash column (MN-180 C18ec 45 µm D60 Å), using methanol as eluent. 29 g of the styrene derivatised aniline was isolated (y: 55%, TLC analysis on TLC Silica gel 60F$_{254}$, supplied by Merck, using hexane as eluent: R$_f$: 0.5).

the synthesis of dye-1:

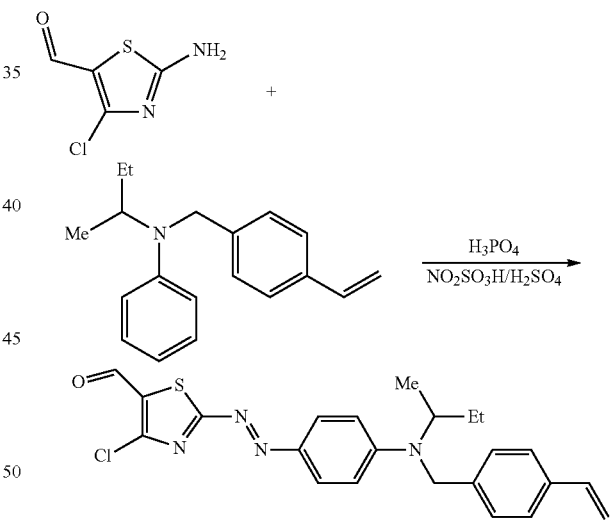

13 g (0.08 mol) 2-amino-4-chlorothiazole-5-carbaldehyde (prepared according to Masuda et al., Bioorganic and Medicinal Chemistry, 12(23), 6171-6182 (2004)) was dissolved in 100 ml phosphoric acid. The mixture was cooled to 0° C. and 20 g of 40% solution of NO$_2$SO$_3$H in sulphuric acid was added, while keeping the mixture at 0° C. The reaction was allowed to continue for one hour at 0° C. This solution was added to a solution of 21.2 g (0.08 mol) of the styrene derivatised aniline in 400 ml of a 5% sulphuric acid solution in water and 150 ml methanol, while keeping the temperature at 0° C. The reaction was allowed to continue for 30 minutes at 0° C. Dye-1 was isolated by filtration and washed with a mixture of water and methanol 1/1. The crude dye was redispersed in methanol, isolated by filtration and dried. 25 g of Dye-1 was isolated (y: 71%, TLC analysis on Partisil™ KC18C, supplied by Whatman, using MeOH/0.25 M NaCl as eluent: $R_f$: 0.4).

Mackam™ 151C and Mackam™ 151 L were supplied by Mcintyre Group LTD.

Lysine, glycerol, tetraethylene pentamine and triethanol amine were supplied by Aldrich.

Olfine™ E1010 was supplied by DKSH.

Pionin™ C158 dry is the 100% compound obtained after evaporation of the ethanol from Pionin-158, supplied by Takemoto Oil Fat Co. Ltd.

Omnipol™ TX is a polymeric thioxanthone supplied by IGM.

Omnipol™ 9210 is a polymeric α-amino-ketone Norrish type I photoinitiator supplied by IGM.

Genopol™ AB2 is a polymeric 4-dimethylaminobenzoic ester based coinitiator supplied by Rahn.

Ebecryl™ 130 is an aliphatic diacrylate supplied by CYTEC.

Dye-2 (CASRN1020729-04-7) has the following structure and can be prepared according to the methods disclosed in EP 427892 A (AGFA):

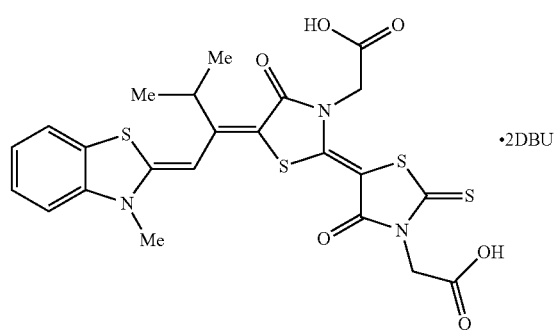 [SMILES: CC(C)C(/C=C1\Sc2ccccc2N1C)=c1/s/c(=C2/SC(=S)N(CC(=O)O)C2=O)n(CC(=O)O)c1=O]

Mowiol™ 488 is a poly(vinyl alcohol) supplied by CLARIANT.

Alkanol™ XC is a surfactant (CAS 68442-09-1) from DU PONT.

Cab-o-jet™ 450 cyan pigment is a self-dispersible cyan pigment dispersion available from CABOT.

Capstone™ FS3100 is a fluorosurfactant from DU PONT.

Tego Twin™ 4000 is a siloxane-based gemini surfactant from EVONIK.

Example 1

This example illustrates the encapsulation methodology wherein blocked isocyanates are encapsulated as thermally reactive chemistry into an inkjet ink.

Synthesis of Caps-1

45.8 g of Trixene™ BI7982 was evaporated at 60° C. under reduced pressure to remove 1-methoxy-2-propanol. The residue was redissolved in 29.8 g of ethyl acetate. 15 g of Takenate™ D110N and 1 g of dye-1 were added. This solution was added to a solution of 9.75 g of Mackam™ 151C, 3.25 g lysine and 0.12 g Olfine™ E1010 in 64 g water and dispersed in the aqueous phase, using an Ultra-Turrax at 18000 rpm for 5 minutes. An additional 69.18 g water was added and the pressure over the mixture was gradually reduced to 150 mm Hg over 5 minutes. The ethyl acetate was evaporated under reduced pressure (120 mm Hg) at a temperature of 50° C., followed by further reducing the pressure to 100 mm Hg. After complete evaporation of all organic solvent and 20 g water, an extra 20 g water was added and the mixture was further heated to 50° C. for 16 hours at ambient pressure. The mixture was allowed to cool down to room temperature and filtered over a 2.7 μm filter. The particle size and particle size distribution was measured using a Zetasizer™ Nano-S (Malvern Instruments, Goffin Meyvis). The capsules had an average particle size of 1.087 μm.

Preparation and Evaluation of Inkjet Ink INV-1

The dispersion Caps-1 as prepared above was used for the formulation of inkjet ink INV-1 as shown in Table 2. The weight percentage (wt %) of each component was based on the total weight of the ink.

TABLE 2

| wt % of component: | INV-1 |
|---|---|
| Caps-1 | 40 |
| Glycerol | 45 |
| Triethanol amine | 0.2 |
| Alkanol ™ XC | 0.1 |
| Water | 14.7 |

The inkjet ink INV-1 had a viscosity of 10 mPa·s and a surface tension of 30 mN/m.

The jetting performance of inkjet ink INV-1 was evaluated using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting on a glass plate. The inkjet ink INV-1 proved to be jettable with intermediate purging.

Example 2

This example illustrates the jetting and reactivity of thermal reactive capsule inks in accordance with the invention on textiles.

Synthesis of Caps-2

45.8 g of Trixene™ BI7982 was evaporated at 60° C. under reduced pressure to remove 1-methoxy-2-propanol. The residue was redissolved in 29.8 g of ethyl acetate. 15 g of Takenate™ D110N and 1 g of dye-1 were added. This solution was added to a solution of 4.85 g of Pionin™ C-158 dry, 3.25 g lysine and 0.12 g Olfine™ E1010 in 68.9 g water and dispersed in the aqueous phase, using an Ultra-Turrax at 18000 rpm for 5 minutes. An additional 68.18 g water was added and the pressure over the mixture was gradually reduced to 150 mm Hg over 5 minutes. The ethyl acetate was evaporated under reduced pressure (120 mm Hg) at a temperature of 50° C., followed by further reducing the pressure to 100 mm Hg. After complete evaporation of all organic solvent and 20 g water, an extra 20 g of water was added and the mixture was further heated to 50° C. for 16 hours at ambient pressure. The mixture was allowed to cool down to room temperature and filtered over a 2.7 μm filter. The particle size and particle size distribution was measured using a Zetasizer™ Nano-S (Malvern Instruments, Goffin Meyvis). The capsules had an average particle size of 0.968 μm.

Preparation and Evaluation of Inkjet Ink INV-2

The dispersion Caps-2 as prepared above was used for the formulation of inkjet ink INV-2 as shown in Table 3. The weight percentage (wt %) of each component was based on the total weight of the ink.

TABLE 3

| wt % of component: | INV-2 |
|---|---|
| Caps-2 | 40 |
| Glycerol | 45 |
| Triethanol amine | 0.2 |
| Alkanol ™ XC | 0.1 |
| Water | 14.7 |

The inkjet ink INV-2 had a viscosity of 10 mPa·s and a surface tension of 30 mN/m.

Wash Resistance

A solid area of inkjet ink INV-2 was printed on cotton, using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting.

The sample was cut in three parts and one part of the sample was treated in an oven at 160° C. for 5 minutes. One of the untreated samples and the thermally treated sample were washed in an aqueous solution containing 10% of a detergent mix supplied by Bielen N.V. (REF: BEL00985) at 90° C. for 10 minutes.

The three samples were compared visually. There was no visual difference between the reference sample and the thermally treated sample. The colour of the untreated sample was completely removed upon washing.

It should also be noted that encapsulation allows printing on textiles, such as cotton, which are normally not readily accessible for inkjet printing with disperse dyes.

Chemical Resistance

A second solid area was printed using the same method as described above. The samples were again cut in two parts and both parts were treated in an oven at 160° C. for 5 minutes. One sample was treated with a 5% hypochlorite solution for 10 seconds and allowed to dry. The change in colour was evaluated visually. No change in colour could be observed between the treated and untreated sample.

As reference experiment, a 1% solution of dye-1 in ethyl acetate was prepared. A cotton sample was treated with the solution and allowed to dry. The sample was cut in two parts. One of the parts was treated with a 5% hypochlorite solution for 10 seconds and allowed to dry. The change in colour was observed visually. The hypochlorite treated sample completely discoloured to a yellow background stain.

This illustrates that the encapsulated dye has a much higher chemical resistance compared to the non encapsulated dye. The high chemical resistance of a textile printed with an encapsulated dye can be advantageously exploited in harsh cleaning of the textile.

Example 3

This example illustrates the synthesis having submicron average particle size, i.e. nanocapsules, and their use in inkjet printing on different types of textiles.

Synthesis of Caps-3

45.8 g of Trixene™ BI7982 was evaporated at 60° C. under reduced pressure to remove 1-methoxy-2-propanol. The residue was redissolved in 29.8 g of ethyl acetate. 15 g of Takenate™ D110N and 1 g of dye-1 were added. This solution was added to a solution of 4.85 g of Pionin™ C-158 dry, 3.25 g lysine and 0.12 g Olfine™ E1010 in 68.9 g water and dispersed in the aqueous phase, using an Ultra-Turrax at 24000 rpm for 5 minutes. An additional 68.18 g water was added and the pressure over the mixture was gradually reduced to 150 mm Hg over 5 minutes. The ethyl acetate was evaporated under reduced pressure (120 mm Hg) at a temperature of 50° C., followed by further reducing the pressure to 100 mm Hg. After complete evaporation of all organic solvent and 20 g water, an extra 20 g of water was added and the mixture was further heated to 50° C. for 16 hours at ambient pressure. The mixture was allowed to cool down to room temperature and filtered first over a 1.6 μm filter, followed by filtration over a 1 μm filter. The particle size and particle size distribution was measured using a Zetasizer™ Nano-S (Malvern Instruments, Goffin Meyvis). The capsules had an average particle size of 0.50 μm.

Preparation and Evaluation of Inkjet Ink INV-3:

The dispersion Caps-3 as prepared above was used for the formulation of inkjet ink INV-3 as shown in Table 4. The weight percentage (wt %) of each component was based on the total weight of the ink

TABLE 4

| wt % of component: | INV-3 |
|---|---|
| Caps-3 | 40 |
| Glycerol | 47 |
| Triethanol amine | 4 |
| Alkanol ™ XC | 1 |
| Water | 8 |

The inkjet ink INV-3 had a viscosity of 10 mPa·s and a surface tension of 33 mN/m.

A solid area of inkjet ink INV-3 was printed on different types of textiles Tex-1 to Tex-4 given in Table 5, using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting.

TABLE 5

| | |
|---|---|
| Tex-1 | AJ DISPLAY FR 320 cm × 100 m UCT76 EO N.P. from AGFA GRAPHICS |
| Tex-2 | AJ FLAG 100% polyester 200 g/m² from AGFA GRAPHICS |
| Tex-3 | Flag 6043FLBF PES-FLAGFABRIC 100% Polyester from GEORG + OTTO FRIEDRICH KG |
| Tex-4 | AJ FLAG 310 cm × 100 m UCT76 EO N.P. from AGFA GRAPHICS |

Wash Resistance

All samples were cut in three parts and one part of each sample was treated in an oven at 160° C. for 5 minutes. One of the untreated parts of each sample and the thermally treated part of each sample were washed in an aqueous solution containing 10% of a detergent mix supplied by Bielen N.V. (REF: BEL00985) at 90° C. for 10 minutes. The loss in colour density for both the treated and untreated part of each sample was evaluated visually.

TABLE 6

| Printed Sample | Untreated part | Heat treated part |
|---|---|---|
| Tex-1 | Complete loss of colour | More than 80% remaining |
| Tex-2 | Less then 5% remaining | More than 90% remaining |
| Tex-3 | Complete loss of colour | No visual loss of density |
| Tex-4 | Less then 5% remaining | No visual loss of density |

From Table 6, it can be concluded that the inkjet inks according to preferred embodiments of the present invention allow good to excellent fixation of dyes to different polyester based textiles.

Example 4

This example illustrates the encapsulation methodology wherein UV curable chemistry is encapsulated as nanocapsules into an inkjet ink. The encapsulated photoinitiators and co-initiators are of the polymeric type allowing inkjet printing of so-called low migration UV curable inkjet inks, for example, for food packaging applications.

Synthesis of Caps-4

1.8 g Omnipol™ TX, 1.8 g Genopol™ AB2, 3.5 g Omnipol™ 9210, 35 g Ebecryl™ 130 and 11 g Takenate™ D110 N were dissolved in 32 g ethyl acetate. This solution was added to an aqueous solution of 9.750 g Mackam™ 151 L, 3.25 g lysine and 0.121 Olfine™ E1010 in 63 g water and dispersed in the aqueous phase, using an Ultra-Turrax at 18000 rpm for 5 minutes. An additional 44 g water was added and the pressure over the mixture was gradually reduced to 150 mm Hg over 5 minutes. The ethyl acetate was evaporated under reduced pressure (120 mm Hg) at a temperature of 50° C., followed by further reducing the pressure to 100 mm Hg. After complete evaporation of all organic solvent and 25 g water, the mixture was further heated to 45° C. for 24 hours at ambient pressure. The mixture was allowed to cool down to room temperature and filtered over a 30 μm filter. The particle size and particle size distribution was measured using a Zetasizer™ Nano-S (Malvern Instruments, Goffin Meyvis). The capsules had an average particle size of 404 nm.

Preparation and Evaluation of Inkjet Inks

The dispersion Caps-4 as prepared above was used for the formulation of inkjet inks INV-4 and INV-5 as shown in Table 7. The weight percentage (wt %) of each component was based on the total weight of the ink.

TABLE 7

| wt % of component: | INV-4 | INV-5 |
|---|---|---|
| Caps-4 | 34.3 | 34.3 |
| Cab-o-jet ™ 450 cyan pigment | 10 | 10 |
| Glycerol | 40 | 40 |
| Capstone ™ FS-3100 | 0.45 | — |
| Tego ™ Twin 4000 | 0.15 | — |
| Alkanol ™ XC | — | 1 |
| Water | 15.1 | 14.7 |

Inkjet ink INV-4 had a viscosity of 9.5 mPa·s and a surface tension of 22 mN/m. Inkjet ink INV-5 had a viscosity of 8.7 mPa·s and a surface tension of 30 mN/m.

The inkjet inks INV-4 and INV-5 were filtered over a 1.3 μm filter.

The jetting performance of the inkjet inks INV-4 and INV-5 was evaluated using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting. Both inkjet inks INV-4 and INV-5 proved to have an excellent jettability.

Example 5

This example illustrates the curing performance of an inkjet ink containing UV curable capsules Preparation and Evaluation of Inkjet Ink INV-6

An inkjet ink INV-6 was formulated according to Table 8 using the capsules Caps-4 of Example 4. The weight percentage of each component was based on the total weight of the inkjet ink.

TABLE 8

| wt % of component: | INV-6 |
|---|---|
| Caps-4 | 90 |
| Cab-o-jet 450 cyan pigment | 10 |

The inkjet ink was coated on an aluminium plate using 20 μm wired bar, followed by a treatment specified in Table 9.

TABLE 9

| Sample | Treatment |
|---|---|
| S-1 | Drying at room temperature |
| S-2 | Drying at room temperature followed by heating in an oven at 150° C. |
| S-3 | Drying at room temperature followed by heating in an oven at 150° C. and UV curing, using the method described above |

The water fastness of each sample S-1 to S-3 was evaluated by putting a drop of water on top of the coated sample and leaving it on top of the plate covered with a glass beaker to avoid evaporation. After 30 minutes, the water dropped was removed using a cotton pad and the damage to the coating was evaluated visually. The results are summarized in Table 10

TABLE 10

| Sample | Water fastness |
|---|---|
| S-1 | Complete removal of the coating |
| S-2 | Complete removal of the coating |
| S-3 | No visual damage to the coating |

From Table 10, it can be concluded that UV curing of INV-6 results in excellent water fastness of the coating.

Example 6

This example illustrates the need for dispersing groups covalently bonded to the polymeric shell, i.e. in order to have self-dispersing nanocapsules in the inkjet ink.

Synthesis of Self Dispersing Capsules Caps-5

1.8 g Omnipol™ TX, 1.8 g Genopol™ AB2, 3.5 g Omnipol™ 9210, 35 g Ebecryl™ 130 and 11 g Takenate™ D110 N were dissolved in 32 g ethyl acetate. This solution was added to an aqueous solution of 9.750 g Mackam™ 151 L, 3.25 g lysine and 0.121 Olfine™ E1010 and dispersed in the aqueous phase, using an Ultra-Turrax at 18000 rpm for 5 minutes. An additional 44 g water was added and the pressure over the mixture was gradually reduced to 150 mm Hg over 5 minutes. The ethyl acetate was evaporated under reduced pressure (120 mm Hg) at a temperature of 50° C., followed by further reducing the pressure to 100 mm Hg. After complete evaporation of all organic solvent and 25 g water, the mixture was further heated to 45° C. for 24 hours at ambient pressure. The mixture was allowed to cool down to room temperature and filtered over a 30 µm filter. The particle size and particle size distribution was measured using a Zetasizer™ Nano-S (Malvern Instruments, Goffin Meyvis). The capsules had an average particle size of 404 nm.

Synthesis of Polymer Stabilized Caps-6:

1.8 g Omnipol™ TX, 1.8 g Genopol™ AB2, 3.5 g Omnipol™ 9210, 16 g Ebecryl™ 130 and 30 g Takenate™ D110 N were dissolved in 32 g ethyl acetate. This solution was added to an aqueous solution of 9.2 g Mowiol™ 488 and 0.12 g Olfine™ E1010 in 67.8 g water and dispersed in the aqueous phase, using an Ultra-Turrax at 20000 rpm for 5 minutes. 33 g water was added and the pressure over the mixture was gradually reduced to 150 mm Hg over 5 minutes. The ethyl acetate was evaporated under reduced pressure (120 mm Hg) at a temperature of 50° C. An additional 25 g of water was removed under reduced pressure. A solution of 2 g tetraethylene pentamine in 8 g water was added and the mixture was heated at 45° C. for 24 hours. The mixture was allowed to cool down to room temperature and filtered over a 30 µm filter. The particle size and particle size distribution was measured using a Zetasizer™ Nano-S (Malvern Instruments, Goffin Meyvis). The capsules had an average particle size of 320 nm.

Preparation and Evaluation of Inkjet Inks

The composition of the inventive inkjet ink INV-7 and comparative inkjet inks COMP-1 and COMP-2 are given in Table 11. The weight percentage (wt %) of each component was based on the total weight of the ink.

TABLE 11

| wt % of component: | INV-7 | COMP-1 | COMP-2 |
|---|---|---|---|
| Caps-5 | 87.5 | — | — |
| Caps-6 | — | 17 | 34 |
| Glycerol | 9 | 50 | 33 |
| Dye-2 | 0.5 | 0.5 | 0.5 |
| Triethanol amine | 2 | 1 | 2 |
| Alkanol ™ XC | 1 | 1 | 1 |
| Water | — | 30.5 | 29.5 |

The viscosity and the surface tension of the inks were measured, and the results are summarized in Table 12.

TABLE 12

| Inkjet Ink | Surface tension (mN/m) | Viscosity (mPa · s) |
|---|---|---|
| INV-7 | 31.2 | 7.5 |
| COMP-1 | 30.5 | 11 |
| COMP-2 | 30.7 | 10.5 |

From Table 12, it should be clear that both the comparative inks COMP-1 and COMP-2 and the inventive ink INV-7 are within the range for jettability.

All inks were filtered over a 1.6 µm filter before jetting. The jetting performance of the inventive ink INV-7 and the comparative inks COMP-1 and COMP-2 was evaluated using a Dimatix™ DMP2831 system, equipped with a standard Dimatix™ 10 pl print head. The ink was jetted at 22° C., using a firing frequency of 5 kHz, a firing voltage of 20 V-25 V, a standard waveform and a standard cartridge setting.

Even with having a having a higher solid content, the inventive inkjet ink INV-7 proved to be jettable, while none of the comparative inks COMP-1 and COMP-2 were jettable.

Example 7

This example illustrates that inkjet inks containing thermal reactive capsules can even be jetted on very difficult substrates like glass.

Evaluation of Inkjet Ink INV-3

The inkjet ink INV-3 of Example 3 was printed on an untreated 3 mm thick standard glass sheet, using the print settings as disclosed in Example 3. The sheet was dried, followed by a thermal treatment at 160° C. for 5 minutes. The adhesion was tested using a coin test. A 2 euro coin under an angle of 45° was used to scratch the image. The image was scratched 20 times and the damage to the image was evaluated visually. After 20 passes over the image, there was no visual damage to the image. From this example, it can be concluded that inkjet ink INV-3, comprising thermally reactive chemistry, gives excellent adhesion to glass.

The invention claimed is:

1. An inkjet ink comprising:
    an aqueous medium; and
    capsules including a polymeric shell surrounding a core; wherein
    the capsules are dispersed in the aqueous medium including a dispersing group covalently bonded to the polymeric shell;
    the core includes one or more chemical reactants that form a reaction product upon application of heat and/or light;
    the polymeric shell includes a polymer selected from the group consisting of polyureas, polyesters, polycarbonates, polyamides, and melamine based polymers, and mixtures thereof; and
    the capsules have an average particle size of no more than 4 µm as determined by dynamic laser diffraction.

2. The inkjet ink according to claim 1, wherein the dispersing group is selected from the group consisting of a carboxylic acid or salt thereof, a sulfonic acid or salt thereof, a phosphoric acid ester or salt thereof, a phosphonic acid or salt thereof, an ammonium group, a sulfonium group, a phosphonium group, and a polyethylene oxide group.

3. The inkjet ink according to claim 1, wherein the polymeric shell includes a polymer selected from the group consisting of a polyamide, a melamine based polymer, a poly(urea-urethane) polymer, and copolymers thereof.

4. The inkjet ink according to claim 1, wherein the one or more chemical reactants includes a monomer, an oligomer, or a polymer that is curable by free radical polymerization or by cationic polymerization.

5. The inkjet ink according to claim 2, wherein the one or more chemical reactants includes a monomer, an oligomer, or a polymer that is curable by free radical polymerization or by cationic polymerization.

6. The inkjet ink according to claim 4, wherein the monomer, the oligomer, or the polymer includes at least one acrylate group as a polymerizable group.

7. The inkjet ink according to claim 5, wherein the monomer, the oligomer, or the polymer includes at least one acrylate group as a polymerizable group.

8. The inkjet ink according to claim 4, further comprising a photoinitiator.

9. The inkjet ink according to claim 1, wherein the one or more chemical reactants includes a thermally curable compound.

10. The inkjet ink according to claim 2, wherein the one or more chemical reactants includes a thermally curable compound.

11. The inkjet ink according to claim 9, wherein the thermally curable compound is a blocked isocyanate.

12. The inkjet ink according to claim 10, wherein the thermally curable compound is a blocked isocyanate.

13. The inkjet ink according to claim 9, further comprising an optothermal converting agent.

14. The inkjet ink according to claim 13, wherein the optothermal converting agent is an infrared dye.

15. The inkjet ink according to claim 1, further comprising a colorant.

16. The inkjet ink according to claim 1, wherein the aqueous medium includes a polymeric latex particle.

17. The inkjet ink according to claim 1, wherein the polymeric shell is crosslinked.

18. The inkjet ink according to claim 2, wherein the polymeric shell is crosslinked.

19. An inkjet printing method comprising the steps of:
   jetting an inkjet ink according to claim 1 on a substrate; and
   applying heat and/or light to the inkjet ink jetted on the substrate to form a reaction product from the one or more chemical reactants in the capsules.

20. The inkjet printing method according to claim 19, wherein the substrate is a textile, leather, glass, pharmaceutical packaging, or food packaging.

* * * * *